United States Patent Office 3,562,330
Patented Feb. 9, 1971

3,562,330
2-PHENOXY-4- AND 5-PHENYL-BUTYL AND -PENTYL-AMINES AND SALTS
Ivan C. Nordin, Ann Arbor, Mich., assignor to Parke, Davis & Company, Detroit, Mich., a corporation of Michigan
No Drawing. Filed July 18, 1968, Ser. No. 745,694
Int. Cl. C07c 93/06
U.S. Cl. 260—570.5
5 Claims

ABSTRACT OF THE DISCLOSURE

The novel amine compounds, specifically 2-phenoxy-4-phenylbutylamine, 2 - phenoxy - 5 - phenylpentylamine and their acid addition salts, are provided by chemically reducing 2-phenoxyphenylamides (II):

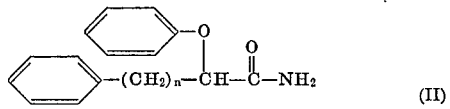

(II)

where $n$ is 2 or 3. The products have pharmacological properties and are useful antiarrhythmic agents.

SUMMARY AND DETAILED DESCRIPTION

This invention relates to the novel amine compounds, 2 - phenoxy - 4 - phenylbutylamine, 2 - phenoxy - 5 - phenylpentylamine, and acid addition salts thereof, and to means for producing the same.

The compounds of the invention are produced by reducing an amide of formula:

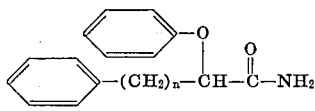

and recovering the product as the free base or corresponding acid addition salt; where $n$ is 2 or 3. Production of the compounds according to the invention is suitably carried out by chemical reduction, catalytic hydrogenation, electrolytic reduction, or other like means. For catalytic hydrogenation using gaseous hydrogen, catalysts which may be conveniently employed are Raney nickel, Raney cobalt, copper chromite and similar catalysts. With such catalysts hydrogen pressures of about 250–400 atmospheres at temperatures of about 200–350° C. are used. Chemical reduction is the preferred method of reduction. Suitable chemical reducing agents are lithium aluminum hydride, lithium aluminum hydride-aluminum chloride, aluminum hydride-aluminum chloride and diborane. A preferred agent for the reduction is lithium aluminum hydride; a solvent is ordinarily employed such as an ether (diethyl ether, dioxane, tetrahydrofuran, dimethoxyethane, diethylene glycol dimethyl ether), a hydrocarbon (benzene, toluene, xylene), or mixtures of any such solvents or similar solvents. When using lithium aluminum hydride as a reducing agent a preferred solvent is a mixture of benzene and diethyl ether. The conditions of time and temperature when using a chemical reducing agent are not critical and can be varied considerably. Using lithium aluminum hydride, the range of 0° C. to the reflux temperature of the reaction mixture may be used for periods ranging from 1–48 hours, preferred conditions being about 15–40° C. for 12–24 hours. At least an equimolar amount of lithium aluminum hydride is employed with the amide starting material. Following hydride reduction, the reaction mixture is hydrolyzed and the product extracted with a solvent. The product can be obtained as the free base or, if desired, as the corresponding acid addition salt by conventional procedures. The free bases form pharmaceutically acceptable acid addition salts with a variety of inorganic and organic acids such as hydrochloric, hydrobromic, hydriodic, sulfuric, acetic, benzoic, citric, maleic, malic, gluconic, ascorbic and related acids. Such acid addition salts, formed by admixture of the free bases with the selected acid, are equivalent to the free bases for purposes of the invention and in specific applications are preferred for their higher water solubility.

The compounds of the invention are useful pharmacological agents. In particular, the compounds are useful antiarrhythmic agents capable of restoring normal cardiac rhythm; the compounds are administered by the intravenous route or the intramuscular route. The antiarrhythmic activity can be demonstrated by standard art-recognized tests, for example, by the test method reported in Federation Proceedings 20:122. By this latter test the test compound is evaluated on the basis of its activity against ventricular fibrillation induced in anesthetized dogs by immersion-tank hypothermia. For the immersion, dogs weighing 6–12 kg. are selected, anesthetized with pentobarbital sodium and then partially immersed in an ice water bath following provision for artificial respiration and for ECG, blood pH and deep esophageal measurements. The test compound dissolved in physiological saline is administered intravenously at the rate of one-fifth the intended dose per 3° C. fall in temperature. Cardiac cooling is continued until the occurrence of either ventricular fibrillation or cardiac arrest. The activity of a given test compound is evaluated by comparing the incidence of ventricular fibrillation in treated dogs with the incidence for simultaneous tested control animals receiving only saline injections. A positive result is one in which a significant reduction in the ratio of fibrillation to arrest occurs, or in which there is significant reduction in the temperature at which ventricular fibrillation occurs. By this test the compounds of the invention are ten times more active than quinidine sulfate, a standard drug for treatment of cardiac arrhythmias; specifically, the compounds are active by the intravenous route at cumulative dosages of about 2 mg. per kilogram of body weight.

The invention is illustrated by the following examples.

EXAMPLE 1

A solution of 2-phenoxy-4-phenylbutyramide (29.0 g.) in 100 ml. of benzene is added dropwise to a stirred mixture of 4.6 g. of lithium aluminum hydride in 1 liter of ether. The resulting mixture is stirred at 20–25° C. for 18 hours and is then treated successively with 4.6 ml. of water, 3.5 ml. of 20% aqueous sodium hydroxide and 16 ml. of water. The mixture is filtered and the filtrate is extracted with 1 N hydrochloric acid (200 ml.). The acid extract is basified with 20% aqueous sodium hydroxide and extracted with ether. The ether extract is washed with water, dried and evaporated and the product, 2-phenoxy-4-phenylbutylamine, is obtained as the fraction distilling in the range from 128–130° C. at a pressure of 0.15 mm. of mercury. A hydrochloride salt of the free base is obtained by dissolving the base in toluene, treating the solution with excess dry hydrogen chloride and with petroleum ether and collecting the hydrochloride salt by filtration; M.P. 110–114° C. after recrystallization from 2-propanol:petroleum ether. A water soluble hydrobromide salt is obtained by treating an ethereal solution of the free base with hydrogen bromide in isopropyl alcohol.

EXAMPLE 2

(a) Following the procedure of Example 1 but substituting as the starting material 2-phenoxy-5-phenyl-valeramide (49.5 g.) in 500 ml. of benzene and using 6.8 g. of lithium aluminum hydride in 1 liter of ether, the product obtained is 2-phenoxy-5-phenylpentylamine; B.P.

137–138° C./0.06 mm. Its hydrochloride salt prepared by the salt-forming procedure of Example 1 melts at 105–110° C. after recrystallization from ethyl acetate. A water soluble citrate salt is obtained by mixing methanolic solutions of the free base and citric acid and concentrating the mixture to a small volume.

(b) The amide starting materials for Example 1 and for Example 2 (a) can be prepared from known substances by the following procedures involving, respectively, the production of diethyl phenoxy(2-phenylethyl and 3-phenylpropyl)malonates, conversion of the esters to 2-phenoxy-4-phenylbutyric and 2-phenoxy-5-phenylvaleric acids and, finally, conversion of the acids to the corresponding 2-phenoxy-4-phenylbutyramide and 2-phenoxy-5-phenylvaleramide: a solution of diethyl phenoxymalonate (76 g.) in 100 ml. of absolute ethanol is added to a solution of sodium ethoxide prepared from 6.9 g. of sodium and 500 ml. of absolute ethanol, 61 g. of 2-bromoethylbenzene is added and the mixture is stirred and heated at reflux for 18 hours. The mixture is evaporated under reduced pressure to remove the bulk of ethanol and the residue is extracted with ether, the ether extract is washed with water, dried and evaporated to provide diethyl phenoxy(2-phenylethyl)malonate; B.P. 168–175° C./0.1 mm. By the same procedure but substituting 66 g. of 3-bromopropylbenzene for 2-bromoethylbenzene, the product is diethyl phenoxy(3-phenylpropyl)malonate; B.P. 170–178° C./0.1 mm.

A solution of 67 g. of diethyl phenoxy(2-phenylethyl)malonate in 250 ml. of ethanol and 19 g. of sodium hydroxide in 50 ml. of water is heated at reflux for 16 hours. The solution is evaporated under reduced pressure and the residue is acidified with hydrochloric acid and extracted with ether. The ether extract is dried, evaporated and the residue heated at 95–100° C. for 3 hours. The residual product is 2-phenoxy-4-phenylbutyric acid. By the same procedure but starting wtih 70 g. of diethyl phenoxy (3-phenylpropyl)malonate the product obtained is 2-phenoxy-5-phenylvaleric acid; M.P. 91–92.5° C.

A solution of 61 g. of 2-phenoxy-4-phenylbutyric acid in 150 ml. of thionyl chloride is heated at reflux for 3 hours and the reaction mixture is then evaporated under reduced pressure. The residue is dissolved in 150 ml. of benzene and the solution is again evaporated under reduced pressure to provide a residue of 2-phenoxy-4-phenylbutyryl chloride. The residual product is dissolved in 100 ml. of acetone and the acetone solution is added with stirring to 500 ml. of concentrated aqueous ammonium hydroxide cooled to 0 to 10° C. The mixture is allowed to stir until the temperature reaches 15° C. and is then diluted with 400 ml. of water. The product, 2-phenoxy-4-phenylbutyramide, separates as a precipitate and is collected by filtration, washed with water and dried; M.P. 122.5–124.5° C. after recrystallization from benzene-petroleum ether.

By the same procedure but starting with 65 g. of 2-phenoxy-5-phenylvaleric acid in place of the butyric acid, the product obtained is 2-phenoxy-5-phenylvaleramide; M.P. 122–122.5° C. after recrystallization from benzene-petroleum ether.

I claim:
1. An amine compound of the group consisting of the free bases 2-phenoxy-4-phenylbutylamine and 2-phenoxy-5-phenylpentylamine and acid addition salts thereof.
2. A compound according to claim 1 which compound is 2-phenoxy-4-phenylbutylamine.
3. A compound according to claim 1 which compound is 2-phenoxy-4-phenylbutylamine hydrochloride.
4. A compound according to claim 1 which compound is 2-phenoxy-5-phenylpentylamine.
5. A compound according to claim 1 which compound is 2-phenoxy-5-phenylpentylamine hydrochloride.

References Cited

UNITED STATES PATENTS 3,106,564   10/1963   Fleming et al. _____ 260—570.7X

ROBERT V. HINES, Primary Examiner

U.S. Cl. X.R.

260—343.7, 473, 501.18, 520, 544, 559, 570.7; 424—330